United States Patent
Oh et al.

(10) Patent No.: US 11,845,586 B2
(45) Date of Patent: Dec. 19, 2023

(54) CONDITION DETECTION SEE-THROUGH STORAGE BOX

(71) Applicant: INTOSEE CO. LTD, Cheonan-si (KR)

(72) Inventors: Jae Hwan Oh, Cheonan-si (KR); Chan Ho Kim, Cheonan-si (KR)

(73) Assignee: INTOSEE CO. LTD, Cheonan-si (KR)

( * ) Notice: Subject to any disclaimer, the term of this patent is extended or adjusted under 35 U.S.C. 154(b) by 491 days.

(21) Appl. No.: 17/274,645

(22) PCT Filed: Jul. 12, 2019

(86) PCT No.: PCT/KR2019/008653
§ 371 (c)(1),
(2) Date: Mar. 9, 2021

(87) PCT Pub. No.: WO2020/067634
PCT Pub. Date: Apr. 2, 2020

(65) Prior Publication Data
US 2021/0339913 A1    Nov. 4, 2021

(30) Foreign Application Priority Data

Sep. 28, 2018  (KR) .................. 10-2018-0116393

(51) Int. Cl.
*B65D 25/54* (2006.01)
*G02B 5/30* (2006.01)
*G02F 1/13357* (2006.01)

(52) U.S. Cl.
CPC ........... *B65D 25/54* (2013.01); *G02B 5/3033* (2013.01); *G02F 1/13362* (2013.01); *B65D 2203/12* (2013.01)

(58) Field of Classification Search
None
See application file for complete search history.

(56) References Cited

U.S. PATENT DOCUMENTS 9,087,471 B2 *  7/2015  Miao ............... G09G 3/003
9,652,892 B2 *  5/2017  Tomlin ............ G02B 27/017
(Continued)

FOREIGN PATENT DOCUMENTS

KR        10-1077886 B1    10/2011
KR    10-2013-0020096 A    2/2013
(Continued)

*Primary Examiner* — Fekadeselassie Girma
(74) *Attorney, Agent, or Firm* — NKL Law; Jae Youn Kim

(57) ABSTRACT

One embodiment of the present disclosure provides a condition detection see-through storage box that stores objects, the condition detection see-through storage box including a storage box body configured to store the objects, a sensor configured to detect a specific condition inside the storage box, a door that is installed on the storage box body and has a transmission window, a light emitting module configured to increase an amount of emitted light according to a signal from the sensor, which has detected the specific condition inside the storage box, to increase an amount of light that is reflected from inside the storage box and heads toward the transmission window, and an optical film provided on the transmission window, thereby informing a user of the specific condition inside the storage box body, wherein the optical film has a light transmittance that prevents the storage box from being see-through from the outside before the sensor detects the specific condition and allows the storage box to be see-through from the outside due to light that is reflected from inside the storage box and transmitted through the transmission window and the optical film due to the light emitting module increasing the amount of emitted light according to the signal from the sensor that has detected the specific condition.

11 Claims, 9 Drawing Sheets

(56) References Cited

U.S. PATENT DOCUMENTS

| | | | |
|---|---|---|---|
| 2006/0193046 A1* | 8/2006 | Yellin | E06B 9/24 359/488.01 |
| 2014/0015762 A1* | 1/2014 | Weng | G07F 9/0235 345/173 |
| 2014/0080593 A1* | 3/2014 | Rivera | G07F 17/3211 463/31 |
| 2019/0192965 A1* | 6/2019 | Chapman | A63F 13/50 |
| 2022/0031071 A1* | 2/2022 | Oh | G02B 27/281 |

FOREIGN PATENT DOCUMENTS

| KR | 10-2014-0078379 A | 6/2014 |
|---|---|---|
| KR | 10-1739232 B1 | 6/2017 |

* cited by examiner

CONDITION DETECTION SEE-THROUGH STORAGE BOX

TECHNICAL FIELD

The present disclosure relates to a condition detection see-through storage box, and more particularly, to a condition detection see-through storage box which becomes see-through to allow the interior to be visible when a specific internal condition is detected.

BACKGROUND ART

Generally, in schools, laboratories, hospitals, and the like, dangerous goods such as medicine, volatile substances, explosive substances, and chemical substances are stored in box-type storage boxes such as storage boxes. Such storage boxes generally have doors that do not transmit light to block light such as sunlight and indoor lighting. For this reason, there is no way to check an internal condition thereof other than a method of opening the door to check the interior, or it is difficult to know the internal condition unless a special device is used. As a result, also in terms of dangerous goods management, in a case in which it is necessary to check chemical substances, flammable or explosive substances, substances prone to deterioration, or the like that are inside the storage box, when the interior of the storage box is not see-through, since the door should be directly opened to check the substances, it is inconvenient and there is always a risk of an accident. In particular, there are problems in that, even when medicine leakage, toxic gas formation, or fire occurs inside the storage box, a user is unable to immediately recognize the occurrence and thus a risk is increased, and when opening the door in such cases, the user has to open the door without knowing the internal condition and thus it is very dangerous for the user.

DISCLOSURE

Technical Problem

The present disclosure is directed to providing a condition detection see-through storage box whose interior becomes see-through when a specific internal condition, such as a dangerous situation, is detected.

Objectives of the present disclosure are not limited to the above-mentioned objectives, and other unmentioned objectives should be clearly understood by those of ordinary skill in the art to which the present disclosure pertains from the description below.

Technical Solution

One embodiment of the present disclosure provides a condition detection see-through storage box that stores objects, the condition detection see-through storage box including a storage box body configured to store the objects, a sensor configured to detect a specific condition inside the storage box, a door that is installed on the storage box body and has a transmission window, a light emitting module configured to increase an amount of emitted light according to a signal from the sensor, which has detected the specific condition inside the storage box, to increase an amount of light that is reflected from inside the storage box and heads toward the transmission window, and an optical film provided on the transmission window, thereby informing a user of the specific condition inside the storage box body, wherein the optical film has a light transmittance that prevents the storage box from being see-through from the outside before the sensor detects the specific condition and allows the storage box to be see-through from the outside due to light that is reflected from inside the storage box and transmitted through the transmission window and the optical film due to the light emitting module increasing the amount of emitted light according to the signal from the sensor that has detected the specific condition.

In an embodiment of the present disclosure, the sensor may include at least one of a temperature sensor configured to detect a temperature inside the storage box body, a light sensor configured to detect illuminance inside the storage box body, a substance sensor configured to detect a chemical substance inside the storage box body, and a movement sensor.

In an embodiment of the present disclosure, the sensor may have different kinds of sensors that correspond to a plurality of specific conditions inside the storage box, and according to a signal from the sensor, the light emitting module may flicker, emit light with a warning sound, or emit different colored lights to correspond to the different kinds of sensors.

In an embodiment of the present disclosure, the transmission window may include an external transmission window and an internal transmission window that are opposite to each other, the light emitting module may be provided on an edge of the door to emit light between the external transmission window and the internal transmission window, and the optical film may be provided only on the external transmission window among the external transmission window and the internal transmission window and may include one or more reflective films.

In an embodiment of the present disclosure, the transmission window may include an external transmission window and an internal transmission window that are opposite to each other, the light emitting module may be provided on an edge of the door to emit light between the external transmission window and the internal transmission window, and the optical film may include an external optical film provided on the external transmission window and an internal optical film that is provided on the internal transmission window and has a light transmittance higher than that of the external optical film.

In an embodiment of the present disclosure, the transmission window may include an external transmission window and an internal transmission window that are opposite to each other, and the light emitting module may include a light emitting element provided on an edge of the door to emit light according to a signal from the sensor and a light guide member configured to guide and diffuse the light from the light emitting element to between the external transmission window and the internal transmission window.

In an embodiment of the present disclosure, the light emitting module may include a light emitting element provided in the vicinity of an edge of the door and a lens configured to diffuse light from the light emitting element, and the light from the light emitting module is directly irradiated into the storage box without passing through the transmission window.

In an embodiment of the present disclosure, the condition detection see-through storage box may further include a signal processing device installed on the storage box body or the door to receive an external signal from the outside and cause the light emitting module to emit light according to the external signal.

In an embodiment of the present disclosure, total light transmittance due to the one or more reflective films of the optical film provided on the external transmission window may be in a range of 1% to 15%.

In an embodiment of the present disclosure, the external optical film may include one or more first reflective films, the internal optical film may include one or more second reflective films, total light transmittance due to the one or more first reflective films may be in a range of 1% to 15%, and total light transmittance due to the one or more second reflective films may be 50% or higher.

In an embodiment of the present disclosure, at least one of the external optical film and the internal optical film may be a reflective polarizing film.

Advantageous Effects

According to an embodiment of the present disclosure, since a condition detection see-through storage box becomes see-through when a condition is detected, a user can view a dangerous condition inside the storage box without opening a door or can be warned of the dangerous condition, and thus the user can promptly and effectively deal with a dangerous situation. Even in ordinary times, when necessary, the user can make the storage box see-through by using means such as a remote controller and a touch pad without opening the door so as to check the interior of the storage box.

The advantageous effects of the present disclosure are not limited to the above and should be understood as including all the advantageous effects that may be inferred from configurations of the disclosure that are described in the detailed description or claims of the present disclosure.

BEST MODE OF THE DISCLOSURE

Figure 1:
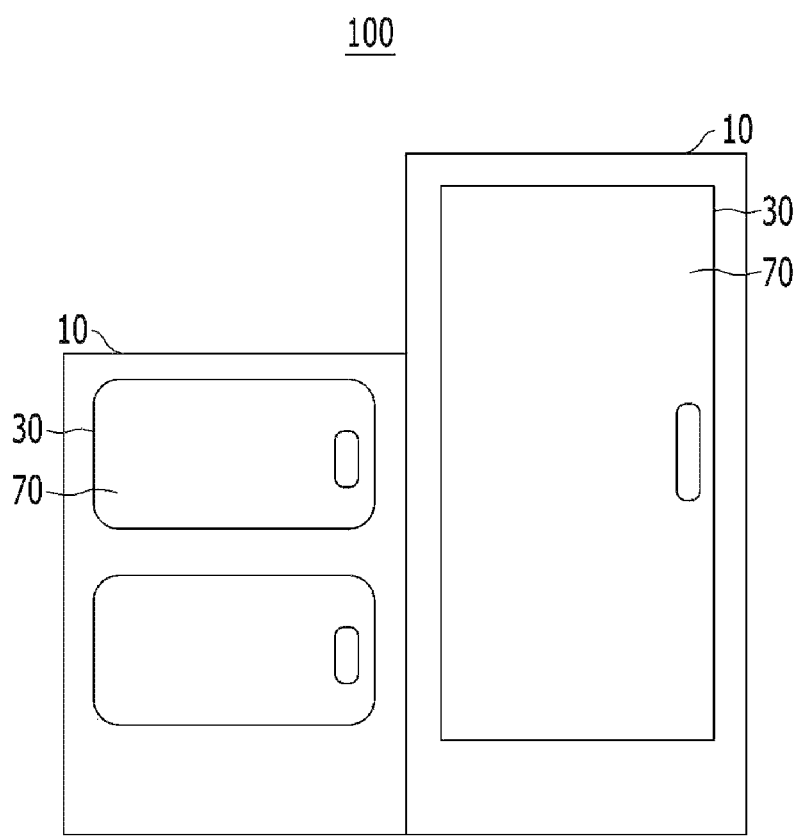
FIG. 1 is a view for describing a condition detection see-through storage box according to an embodiment of the present disclosure.

Hereinafter, the present disclosure will be described with reference to the accompanying drawings. However, the present disclosure may be implemented in various different forms and thus is not limited to embodiments described herein. Also, parts unrelated to the description have been omitted to clearly describe the present disclosure, and like elements are denoted by like reference numerals throughout the specification.

Throughout the specification, when a certain part is mentioned as being "connected to (linked to, in contact with, coupled to)" another part, this not only includes a case in which the certain part is "directly connected" to the other part but also includes a case in which the certain part is "indirectly connected" to the other part while another member is disposed therebetween. Also, when a certain part is mentioned as "including" a certain element, unless particularly stated otherwise, this indicates that the certain part may further include another element instead of excluding another element.

Terms used in the present specification are only used to describe specific embodiments and are not intended to limit the present disclosure. A singular expression includes a plural expression unless the context clearly indicates otherwise. In the present specification, terms such as "include" or "have" should be understood as specifying that features, numbers, steps, operations, elements, components, or combinations thereof are present and not as precluding the possibility of the presence or addition of one or more other features, numbers, steps, operations, elements, components, or combinations thereof in advance.

Hereinafter, embodiments of the present disclosure will be described in detail with reference to the accompanying drawings.

Figure 2:
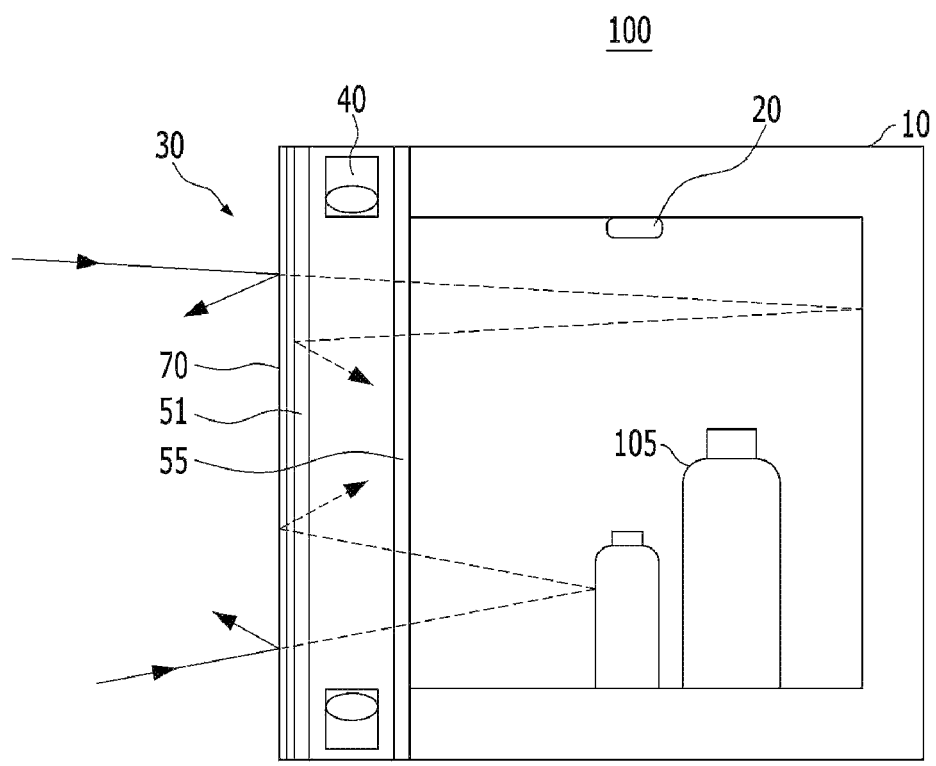
FIG. 2 is a view for describing the condition detection see-through storage box in ordinary times according to an embodiment.

FIG. 1 illustrates a condition detection see-through storage box according to an embodiment of the present disclosure. FIG. 2 is a view for describing the condition detection see-through storage box in ordinary times according to an embodiment.

Referring to FIGS. 1 and 2, a condition detection see-through storage box 100 includes a storage box body 10, a sensor 20, a door 30, a light emitting module 40, and an optical film 70. Dangerous goods such as a chemical substance container 105, a medicine container, a volatile substance, a combustible substance, an explosive substance, and a substance prone to deterioration may be stored in the storage box body 10. The sensor 20 may be installed on the storage box body 10 or the door 30 to detect a specific condition, such as an occurrence of gas outflow, fire, or toxic material formation, inside the storage box. The sensor 20 that has detected the specific condition may transmit a signal to the light emitting module 40 via a wire or wirelessly. The door 30 is installed on the storage box body 10 and has transmission windows 51 and 55. The transmission windows 51 and 55 may be made of, for example, transparent glass or resin (e.g., polycarbonate). According to the signal from the sensor 20 that has detected the specific condition inside the storage box, the light emitting module 40 emits light or increases an amount of emitted light to increase an amount of light that is reflected from inside the storage box and heads toward the transmission windows 51 and 55. This will be further described below. The optical film 70 is provided on the transmission window 51 and has a light transmittance in a predetermined range. For example, the light transmittance of the optical film 70 is selected so that, when the light emitting module 40 is turned off, the storage box is not see-through from the outside under a normal sunlight or lighting condition. Also, the light transmittance of the optical film 70 is selected so that, when the light emitting module 40 emits light, light that is output from the light emitting module 40, reflected from the optical film 70 or the transmission windows 51 and 55, and irradiated into the storage box is reflected from inside the storage box such that the amount of light transmitting through the transmission windows 51 and 55 and the optical film 70 is increased and the storage box is see-through from the outside. Accordingly, the condition detection see-through storage box 100 blocks sunlight or indoor lighting in ordinary times and, when a specific condition such as an occurrence of a dangerous situation is detected, becomes see-through to inform a user of the specific condition inside the storage box body 10.

Figure 3:
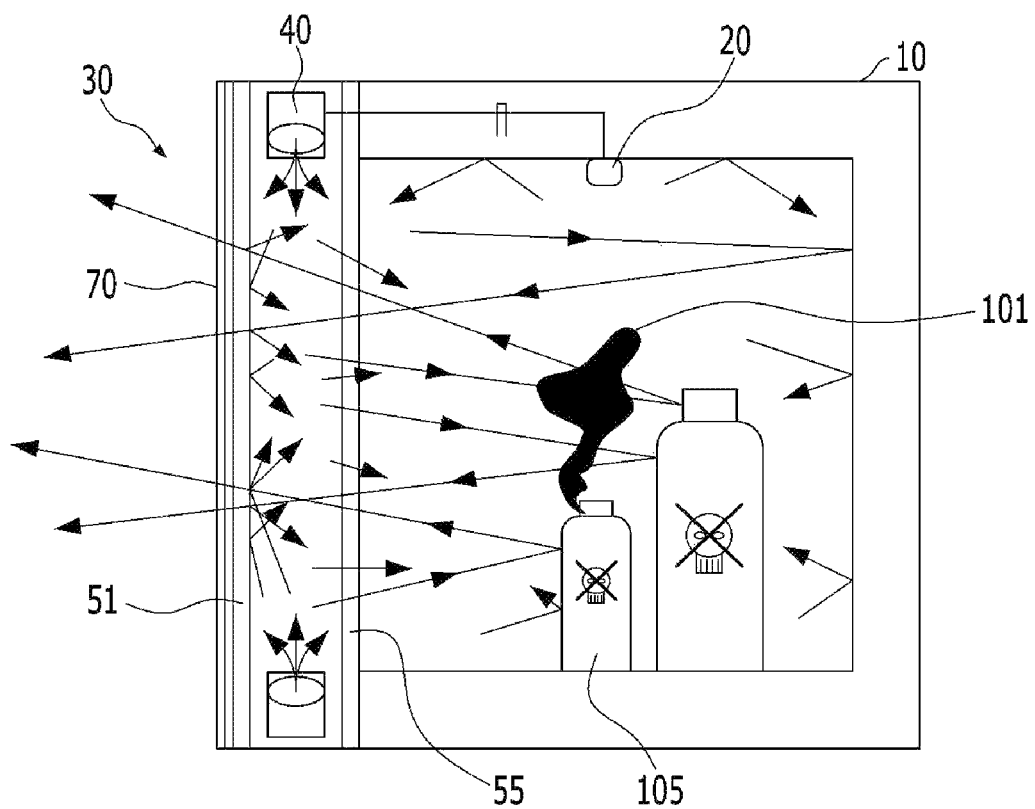
FIG. 3 is a view for describing the see-through storage box when a condition is detected in the condition detection see-through storage box of 2.

FIG. 3 is a view for describing the see-through storage box when a condition is detected in the condition detection see-through storage box of FIG. 2.

In the present embodiment, the transmission windows 51 and 55 include an external transmission window 51 and an internal transmission window 55 that are opposite to each other. The internal transmission window 55 is provided between the external transmission window 51 and the storage box body 10. The light emitting module 40 may be provided on, for example, an edge of the door 30 to emit light between the external transmission window 51 and the internal transmission window 55 according to a signal from the sensor 20. The light emitting module 40 may include a light emitting diode (LED).

In the present embodiment, the optical film 70 is provided only on the external transmission window 51 among the external transmission window 51 and the internal transmission window 55. In FIG. 3, the optical film 70 is attached to an outer surface of the external transmission window 51. Of course, unlike this, the optical film 70 may also be provided on an inner surface of the external transmission window 51. The optical film 70 may include one or more reflective films and may be formed by overlapping two or three reflective films. The number of reflective films may vary according to the light transmittance of the reflective film. In order to prevent the storage box from being see-through from the outside in ordinary times and allow the storage box to be see-through when a condition is detected, preferably, the total light transmittance of the optical film 70 due to light transmittances of the one or more reflective films is in a range of 1% to 15%.

The sensor 20 may include at least one of a temperature sensor configured to detect a temperature inside the storage box body 10, a light sensor configured to detect illuminance or light inside the storage box body 10, a substance sensor configured to detect a chemical substance inside the storage box body 10, and a movement sensor. For example, when a toxic gas is generated from a container stored in the storage box as illustrated in FIG. 3, the sensor 20 may detect this. The sensor 20 that has detected the specific condition transmits a signal to the light emitting module 40 via a wire or wirelessly. For example, the sensor 20 is installed in the storage box body 10 and is electrically connected to the light emitting module 40 as illustrated in FIG. 3. Here, since a method of transmitting a signal via a wire or wirelessly is a well-known art, further detailed description thereof will be omitted.

The light emitting module 40 outputs light according to a signal from the sensor 20, and the output light is reflected and transmitted as the light travels between the external transmission window 51 and the internal transmission window 55. In the present embodiment, since the optical film 70 is provided on the external transmission window 51 and the light transmittance of the external transmission window 51 is in a range of 1% to 15% as described above, a considerable amount of light is reflected from the optical film 70, transmitted through the internal transmission window 55, and irradiated into the storage box. Through the process in which the light is reflected from the optical film 70, the light may be irradiated into the storage box while the light is not biased and uniformity thereof is generally improved. Light reflected from inside the storage box is emitted to the outside again through the internal transmission window 55, the external transmission window 51, and the optical film 70. Of course, due to the light transmittance of the optical film 70, it is not possible for a large amount of light to be reflected and emitted to the outside, but the absolute amount of light transmitted through the optical film 70 is significantly increased as compared to ordinary times (e.g., when the light emitting module 40 is turned off). For example, referring to the graph illustrated in FIG. 9, when the amount of light transmitted and emitted to the outside (Y-axis) exceeds a predetermined level L1, a condition in which the interior of the storage box is visible to the human eye may be reached. That is, when light is emitted to a predetermined light amount level L1 or below, objects inside the storage box would not be identifiable to the human eye. A suitable light transmittance that allows the storage box to be see-through when a condition is detected may be selected by causing the light emitting module 40 to emit light and changing the light transmittance of the optical film 70, and as a result of research, it was found that, when the total light transmittance of the optical film 70 is in a range of 1% to 15% as described above, the storage box has characteristics of being opaque in ordinary times and being see-through when a condition is detected based on the human eye. In particular, it was found that the total light transmittance of the optical film 70 is also sufficient to serve as a characteristic of the optical film 70 that is to block external light such as sunlight. In a case in which the total light transmittance of the optical film 70 exceeds 15%, the opaque/see-through characteristics are not favorable. In this way, the amount of light that is transmitted from inside the storage box to the outside when a condition is detected is sufficient for the interior of the storage box to be visible to the human eye, and thus it is possible to promptly deal with danger.

Figure 4:
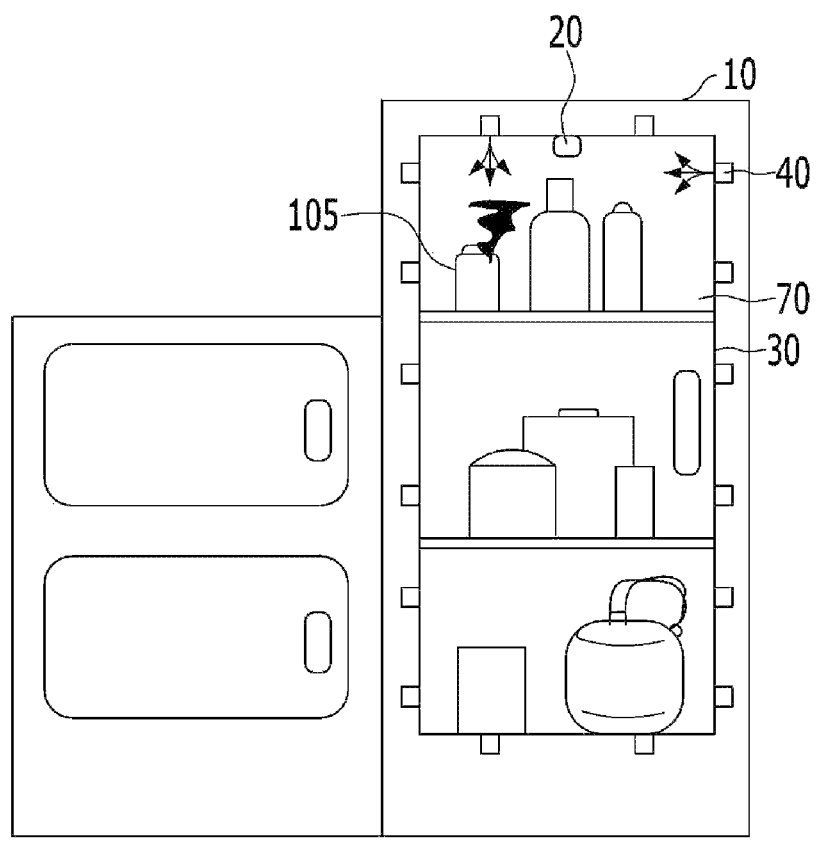
FIG. 4 is a view for describing an example of a light emitting module in the condition detection see-through storage box.

FIG. 4 is a view for describing an example of the light emitting module 40 in the condition detection see-through storage box.

The light emitting module 40 may be provided on an edge of the door 30 as illustrated in FIG. 4 and may emit light between the external transmission window 51 and the internal transmission window 55. An installation position of the light emitting module 40 is not determined only to be the edge of the door 30. In the present embodiment, since the light emitting module 40 emits light between the external transmission window 51 and the internal transmission window 55, it is advantageous to install the light emitting module 40 on the edge of the door 30 and, in particular, between the external transmission window 51 and the internal transmission window 55. The light emitting module 40 may include an LED, and installing a plurality of light emitting modules 40 along the edge of the door 30 as illustrated in FIG. 4 may allow light to be generally uniformly irradiated into the storage box.

Figure 5:
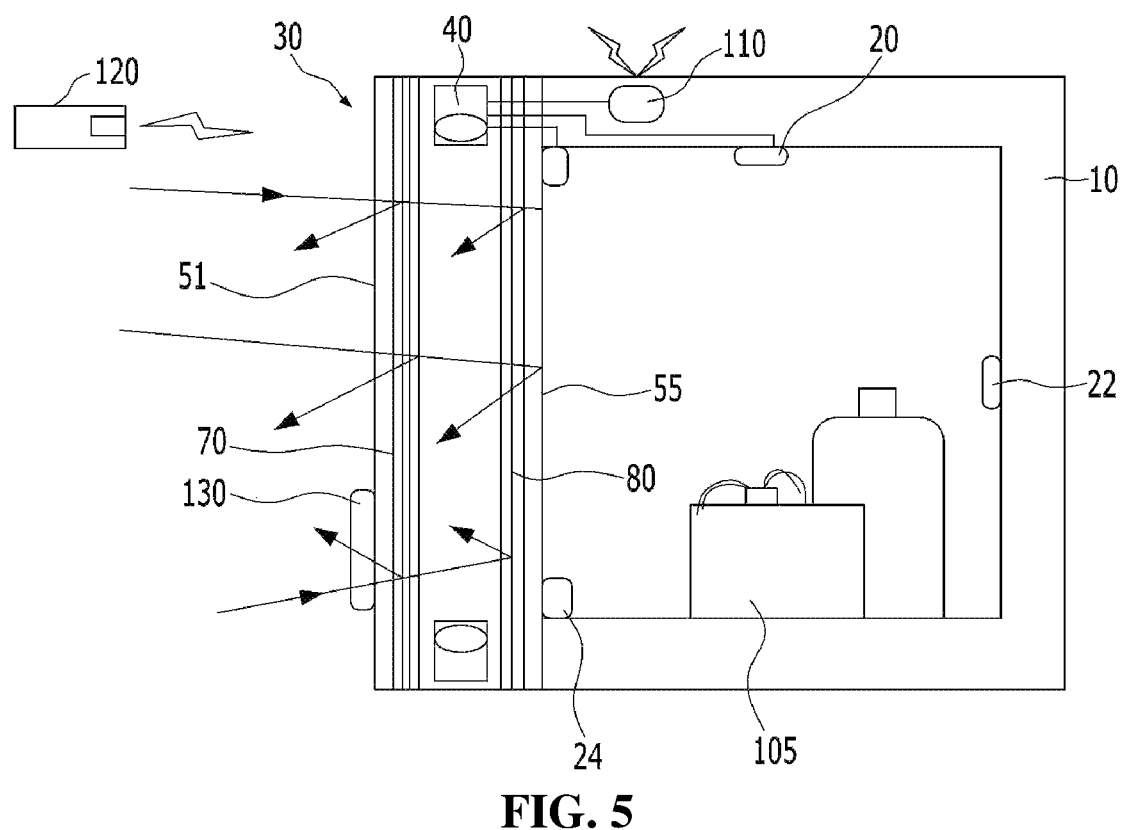
FIG. 5 is a view for describing a condition detection see-through storage box in ordinary times according to another embodiment.
Figure 6:
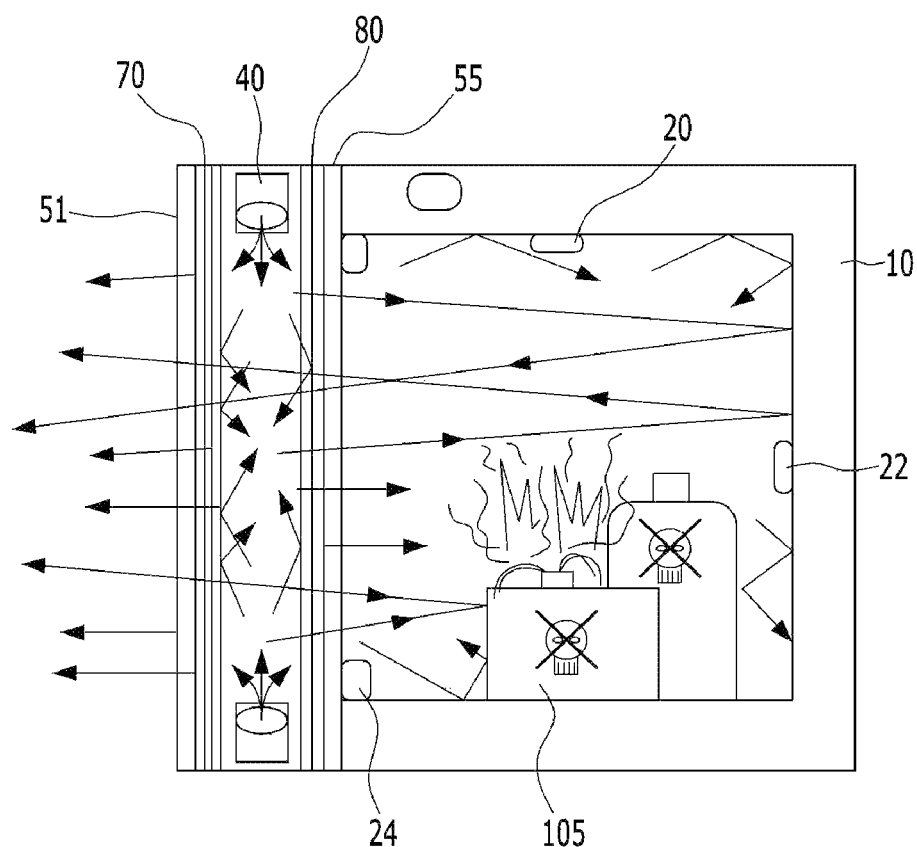
FIG. 6 is a view for describing the see-through storage box when a condition is detected in the condition detection see-through storage box of FIG. 5.

FIG. 5 is a view for describing a condition detection see-through storage box in ordinary times according to another embodiment. FIG. 6 is a view for describing the see-through storage box when a condition is detected in the condition detection see-through storage box of FIG. 5.

In the present embodiment, optical films 70 and 80 include an external optical film 70 provided on the external transmission window 51 and an internal optical film 80 provided on the internal transmission window 55. The external optical film 70 is provided on an inner side surface of the external transmission window 51, and the internal optical film 80 is provided on an outer side surface of the internal transmission window 55. Here, inner and outer sides are defined such that a side closer to the storage box body 10 is referred to as the inner side. The optical films may also be arranged differently from the above, but the optical films being configured as described above may be more advantageous in protecting the optical films 70 and 80. In the present embodiment, the internal optical film 80 has a light transmittance higher than that of the external optical film 70. The external optical film 70 may include one or more first reflective films, and the internal optical film 80 may include one or more second reflective films. The total light transmittance due to the one or more first reflective films may be preferably in a range of 1% to 15% to be advantageous for securing the above-described opaque/see-through characteristics, and the total light transmittance due to the one or more second reflective films may be preferably 50% or higher. Unlike the reflective films, a method of depositing and coating a reflective material (e.g., aluminum) on the transmission windows 51 and 55 may also be used. Due to the optical films 70 and 80, in ordinary times, the door 30 may look like a mirror and the storage box is not see-through.

The sensor 20 may have different kinds of sensors 20, 22, and 24 (e.g., a substance sensor, a temperature sensor, a light sensor, a movement sensor) that correspond to a plurality of specific conditions inside the storage box and, accordingly, the sensor 20 may detect a specific substance inside the storage box, detect a temperature change or an illuminance change inside the storage box, or detect vibration, falling of an object, or the like inside the storage box and may generate a signal, and a user may set such a detection function. The light emitting module 40 may be set to flicker or emit light with a warning sound according to the signal from the sensor 20. Also, the light emitting module 40 may be set to emit different colored lights to correspond to the different kinds of sensors 20, and for example, an RGB LED may be used as the light emitting module 40.

When a condition is detected by the sensor 20, as light is output from the light emitting module 40 and repeatedly reflected between the external optical film 70 and the internal optical film 80, light is irradiated into the storage box through the internal optical film 80 whose light transmittance is higher, the amount of light that is reflected from inside the storage box, transmitted through the internal optical film 80, and then transmitted through the external optical film 70 is increased such that an illuminance difference between the interior of the storage box and the outside is decreased, and thus the storage box may be see-through. Since the light is diffused as the light is repeatedly reflected, formation of shadows of articles stored inside the storage box may be prevented, and the objects may be seen more clearly.

Although the sensor 20 causes the light emitting module 40 to emit light and the storage box to be see-through when a condition is detected, in a case in which it is necessary for a user to check the interior of the storage box in ordinary times, a means that allows the interior of the storage box to be checked without opening the door 30 may be necessary. For example, as illustrated in FIG. 5, the condition detection see-through storage box 100 may further include a signal processing device 110 installed on the storage box body 10 or the door 30. The signal processing device 110 may receive an external signal (e.g., a remote controller signal) and cause the light emitting module 40 to emit light according to the external signal. Alternatively, the signal processing device 110 may be a touch pad 130, or a switch, that is provided on an outer side surface of the door 30 to transmit a signal to the light emitting module 40 according to a user's touch. Meanwhile, the condition detection see-through storage box 100 may further include a switch configured to turn a power supply to the sensor 20 or the light emitting module 40 on or off or turn the sensor 20 on or off to turn the see-through function on or off, or the touch pad may have such functions.

Figure 7:
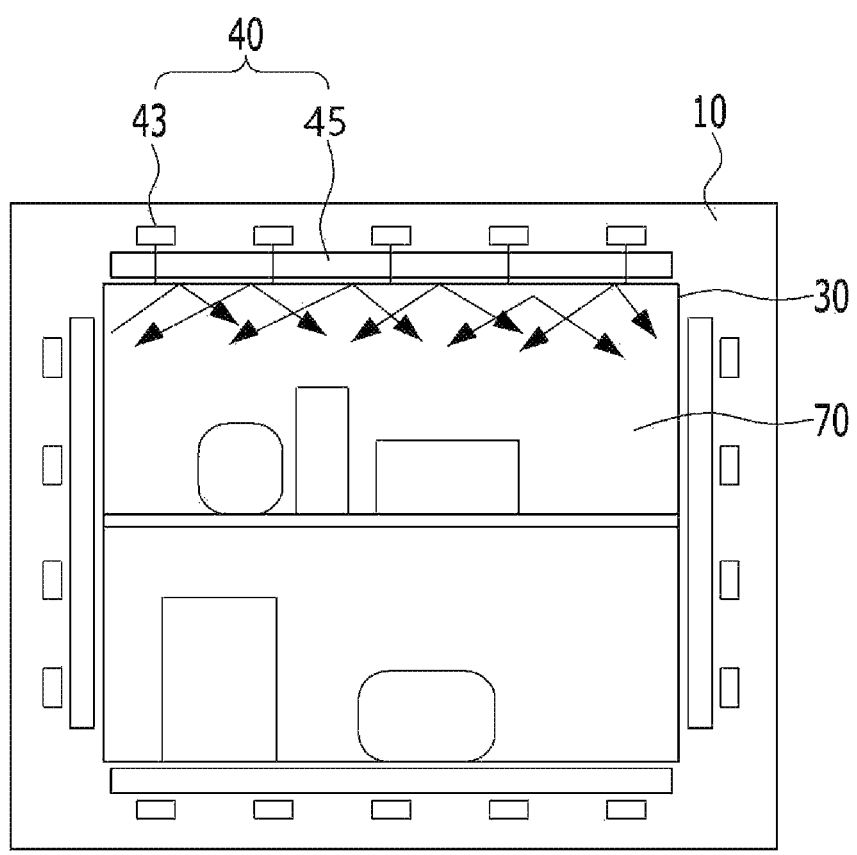
FIG. 7 is a view for describing a condition detection see-through storage box according to still another embodiment of the present disclosure.

FIG. 7 is a view for describing a condition detection see-through storage box according to still another embodiment of the present disclosure.

In the present embodiment, the light emitting module 40 includes a light emitting element 43 provided on an edge of the door 30 to emit light according to a signal from the sensor 20 and a light guide member 45 configured to guide and diffuse the light from the light emitting element 43 to between the external transmission window 51 and the internal transmission window 55. The light guide member 45 may be a bar-shaped member made of a resin material. For example, a member made of the same material as a light guide plate used in the field of display devices may be used as the light guide member 45. For example, as illustrated in FIG. 7, a plurality of light emitting elements 43 may be disposed along a circumference of the edge of the door 30, and the bar-shaped light guide member 45 may be provided at each side of the edge of the door.

Figure 8:
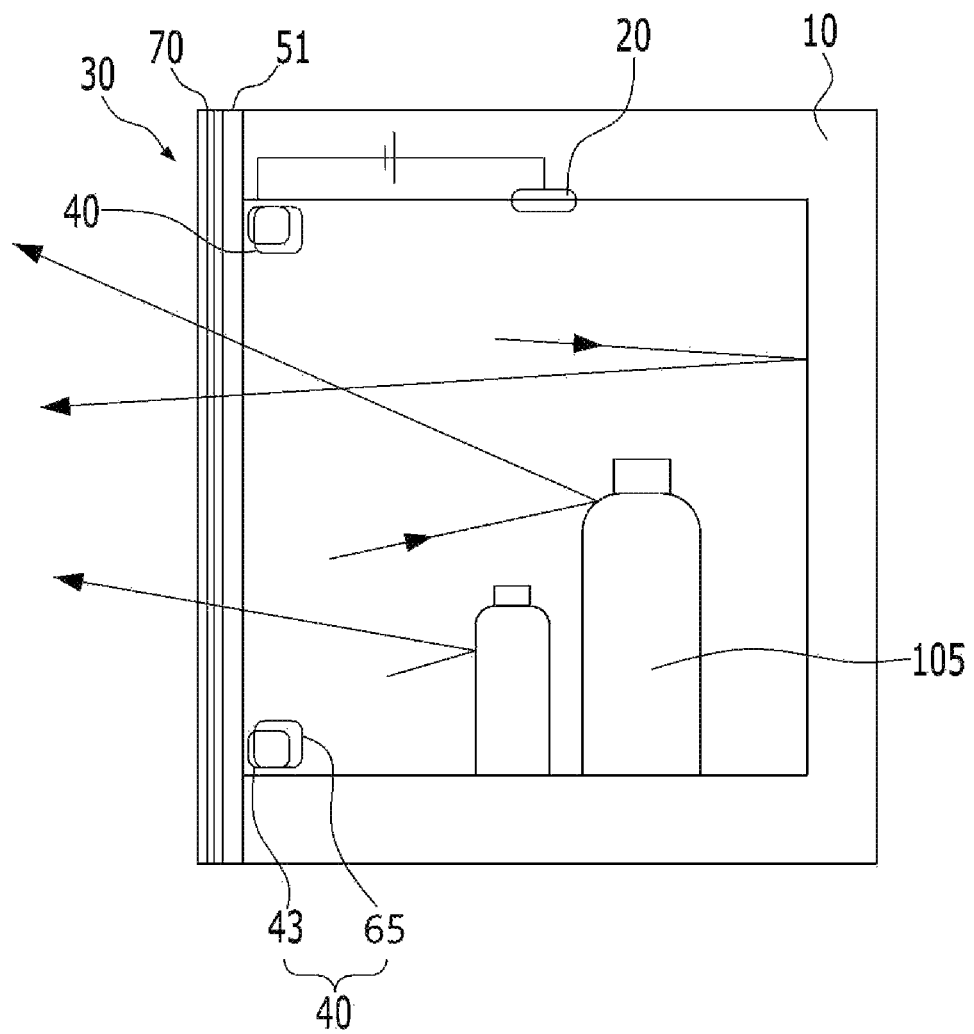
FIG. 8 is a view for describing a condition detection see-through storage box according to yet another embodiment of the present disclosure.

FIG. 8 is a view for describing a condition detection see-through storage box according to yet another embodiment of the present disclosure.

In the present embodiment, since the condition detection see-through storage box is substantially the same as the condition detection see-through storage box 100 described above with reference to FIGS. 1 to 3 except that the door 30 has a single transmission window 51 and the light emitting module 40 is disposed at a different position, overlapping description will be omitted. In the present embodiment, the door 30 has a single transmission window 51. The optical film 70 may include a plurality of reflective films and is attached to the single transmission window 51. Preferably, the total light transmittance of the optical film 70 is in a range of 1% to 15%. Also, in the present embodiment, the light emitting module 40 includes the light emitting element 43 provided in the vicinity of the edge of the door 30 and a lens 65 configured to diffuse the light from the light emitting element 43. Different from the above embodiments, the light emitting module 40 may be installed so that the light from the light emitting module 40 is directly irradiated into the storage box without passing through the transmission window 51. For example, the light emitting module 40 may be provided at an upper portion or lower portion inside the door 30 or may be installed in the storage box body 10 in the vicinity of the door 30. When the light emitting element 43 emits light due to the sensor 20, since the light is diffused by the lens 65 and is generally uniformly irradiated into the storage box, shadows may be reduced. Light reflected from inside the storage box is output to the outside through the optical film 70, and thus the storage box becomes see-through.

Figure 9:
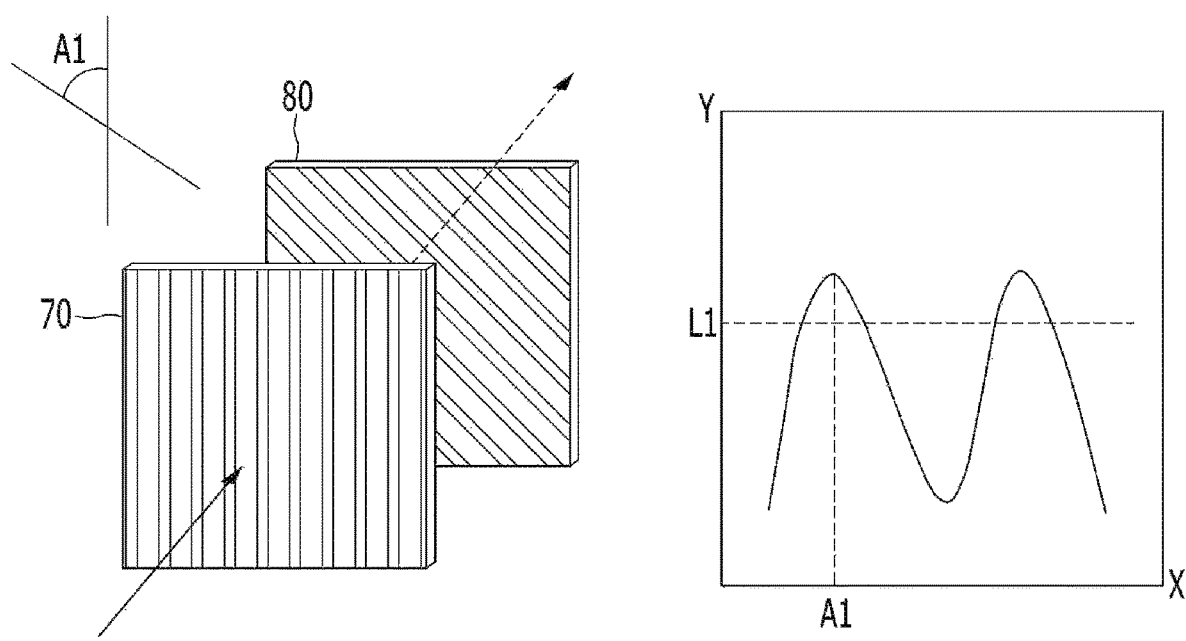
FIG. 9 is a view for describing a condition detection see-through storage box according to yet another embodiment of the present disclosure.

FIG. 9 is a view for describing a condition detection see-through storage box according to yet another embodiment of the present disclosure.

In the present embodiment, optical films 70 and 80 include an external optical film 70 provided on the external transmission window 51 and an internal optical film 80 provided on the internal transmission window 55. At least one of the external optical film 70 and the internal optical film 80 may be a reflective polarizing film. The reflective polarizing film reflects a portion of incident light and transmits a portion thereof, and the transmitted light is polarized along a polarization axis. In a case in which the reflective polarizing film is used for both the external optical film 70 and the internal optical film 80, as shown in the graph of FIG. 9, the amount of transmitted light may be changed (Y-axis) according to changes in an angle A1 formed between polarization axes. Here, the light from the light emitting module 40, which has gone through the reflection process, is reflected and polarized while passing through the internal optical film 80, and the light reflected from inside the storage box is reflected and polarized while passing through the internal optical film 80 again and is incident on the external optical film 70 and reflected and polarized. The light emitted through the external optical film 70 may vary according to changes in the angle A1 formed between the polarization axes, and a suitable angle A1 that corresponds to the light amount L1, which serves as a boundary where the storage box is see-through when the light emitting module 40 emits light and is opaque when the light emitting module 40 is turned off, is selected.

In this way, according to the condition detection see-through storage box 100, since the condition detection see-through storage box 100 becomes see-through when a condition is detected, a user may view a dangerous condition inside the storage box without opening a door or may be warned of the dangerous condition, and thus the user may promptly and effectively deal with a dangerous situation. Even in ordinary times, when necessary, the user may make the storage box see-through by using means such as a remote controller, a touch pad, or a switch without opening the door 30 and check the interior of the storage box.

The above-given description of the present disclosure is merely illustrative, and those of ordinary skill in the art to which the present disclosure pertains should understand that the present disclosure may be easily modified in other specific forms without changing the technical idea or essential features of the present disclosure. Therefore, the embodiments described above should be understood as being illustrative, instead of limiting, in all aspects. For example, each element described as a single type may also be embodied in a distributed manner, and likewise, elements described as being distributed may also be embodied in a combined form.

The scope of the present disclosure is defined by the claims below, and the meaning and scope of the claims and all changes or modified forms derived from their equivalents should be interpreted as belonging to the scope of the present disclosure.

MODES OF THE DISCLOSURE

The modes of the disclosure have been described above in the description of the best mode of the disclosure.

The invention claimed is:

1. A condition detection see-through storage box that stores objects, the condition detection see-through storage box comprising:
   a storage box body configured to store the objects;
   a sensor configured to detect a specific condition inside the storage box;
   a door that is installed on the storage box body and has a transmission window;
   a light emitting module configured to increase an amount of emitted light according to a signal from the sensor, which has detected the specific condition inside the storage box, to increase an amount of light that is reflected from inside the storage box and heads toward the transmission window; and
   an optical film that is provided on the transmission window and has a light transmittance that prevents the storage box from being see-through from the outside before the sensor detects the specific condition and allows the storage box to be see-through from the outside due to light that is reflected from inside the storage box and transmitted through the transmission window and the optical film due to the light emitting module increasing the amount of emitted light according to the signal from the sensor that has detected the specific condition,
   thereby informing a user of the specific condition inside the storage box body.

2. The condition detection see-through storage box of claim 1, wherein the sensor includes at least one of a temperature sensor configured to detect a temperature inside the storage box body, a light sensor configured to detect illuminance inside the storage box body, a substance sensor, and a movement sensor.

3. The condition detection see-through storage box of claim 1, wherein the sensor has different kinds of sensors that correspond to a plurality of specific conditions inside the storage box, and according to a signal from the sensor, the light emitting module flickers, emits light with a warning sound, or emits different colored lights to correspond to the different kinds of sensors.

4. The condition detection see-through storage box of claim 1, wherein:
   the transmission window includes an external transmission window and an internal transmission window that are opposite to each other;
   the light emitting module is provided on an edge of the door to emit light between the external transmission window and the internal transmission window; and
   the optical film is provided only on the external transmission window among the external transmission window and the internal transmission window and includes one or more reflective films.

5. The condition detection see-through storage box of claim 1, wherein:
   the transmission window includes an external transmission window and an internal transmission window that are opposite to each other;
   the light emitting module is provided on an edge of the door to emit light between the external transmission window and the internal transmission window; and
   the optical film includes an external optical film provided on the external transmission window and an internal optical film that is provided on the internal transmission window and has a light transmittance higher than that of the external optical film.

6. The condition detection see-through storage box of claim 1, wherein:
   the transmission window includes an external transmission window and an internal transmission window that are opposite to each other; and
   the light emitting module includes a light emitting element provided on an edge of the door to emit light according to a signal from the sensor and a light guide member configured to guide and diffuse the light from the light emitting element to between the external transmission window and the internal transmission window.

7. The condition detection see-through storage box of claim 1, wherein:
   the light emitting module includes a light emitting element provided in the vicinity of an edge of the door and a lens configured to diffuse light from the light emitting element; and
   the light from the light emitting module is directly irradiated into the storage box without passing through the transmission window.

8. The condition detection see-through storage box of claim 1, further comprising a signal processing device installed on the storage box body or the door to receive an external signal from the outside and cause the light emitting module to emit light according to the external signal.

9. The condition detection see-through storage box of claim 4, wherein total light transmittance due to the one or more reflective films of the optical film is in a range of 1% to 15%.

10. The condition detection see-through storage box of claim 5, wherein:
    the external optical film includes one or more first reflective films and the internal optical film includes one or more second reflective films;
    total light transmittance due to the one or more first reflective films is in a range of 1% to 15%; and
    total light transmittance due to the one or more second reflective films is 50% or higher.

11. The condition detection see-through storage box of claim 5, wherein at least one of the external optical film and the internal optical film is a reflective polarizing film.

* * * * *